United States Patent
Tseng et al.

(10) Patent No.: US 11,756,261 B2
(45) Date of Patent: Sep. 12, 2023

(54) SINGLE-PERSPECTIVE IMAGE RELIGHTING

(71) Applicant: Ford Global Technologies, LLC, Dearborn, MI (US)

(72) Inventors: Nathan Tseng, Canton, MI (US); Nikita Jaipuria, Union City, CA (US); Xianling Zhang, San Jose, CA (US); Rohan Bhasin, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/523,157

(22) Filed: Nov. 10, 2021

(65) Prior Publication Data
US 2023/0147607 A1 May 11, 2023

(51) Int. Cl.
*G06T 15/20* (2011.01)
*G06T 15/00* (2011.01)
*G06T 15/50* (2011.01)

(52) U.S. Cl.
CPC .......... *G06T 15/205* (2013.01); *G06T 15/005* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 8,294,794 B2 | 10/2012 | Zhang et al. | |
| 9,892,550 B2 | 2/2018 | Ma et al. | |
| 10,504,282 B2 | 12/2019 | Levinson et al. | |
| 10,997,457 B2 | 5/2021 | Rhemann et al. | |
| 2014/0028801 A1* | 1/2014 | Tin | H04N 13/204 348/136 |
| 2015/0097834 A1* | 4/2015 | Ma | G06T 17/05 345/426 |
| 2017/0103091 A1* | 4/2017 | Kontkanen | G06F 16/5838 |
| 2019/0266789 A1* | 8/2019 | Rezaiifar | G06T 7/194 |
| 2021/0034914 A1 | 2/2021 | Bansal | |

(Continued)

FOREIGN PATENT DOCUMENTS

| | | | |
|---|---|---|---|
| CN | 108765540 A | 11/2018 | |
| CN | 113139917 | * 7/2021 | ............... G06T 5/00 |

(Continued)

OTHER PUBLICATIONS

Carlson et al., "Shadow Transfer: Single Image Relighting for Urban Road Scenes", arXiv:1909.10363v2 [cs.CV] Sep. 26, 2019.

(Continued)

*Primary Examiner* — Andrew G Yang
(74) *Attorney, Agent, or Firm* — Frank A. MacKenzie; Bejin Bieneman PLC

(57) ABSTRACT

A computer includes a processor and a memory storing instructions executable by the processor to receive a first image of a scene in a first lighting condition, generate a three-dimensional representation of the scene based on the first image, and generate a second image of the scene in a second lighting condition based on the three-dimensional representation and on the first image. The first image is an only image of the scene used for generating the three-dimensional representation. The first image is an only image of the scene used for generating the second image.

14 Claims, 7 Drawing Sheets

(56) References Cited

U.S. PATENT DOCUMENTS

| | | |
|---|---|---|
| 2021/0037195 A1* | 2/2021 | Cutler .................. H04L 51/216 |
| 2021/0263152 A1 | 8/2021 | Halder |
| 2021/0358204 A1* | 11/2021 | Yoneda .................. G06T 7/174 |
| 2022/0309745 A1 | 9/2022 | Bigos et al. |

FOREIGN PATENT DOCUMENTS

| | | | |
|---|---|---|---|
| JP | 2019219928 | * 12/2019 | ............ G06T 15/50 |
| WO | 2019182782 A1 | 9/2019 | |

OTHER PUBLICATIONS

Einabadi et al., "Deep Neural Models for Illumination Estimation and Relighting: A Survey", Computer Graphics forum, vol. 0 (2021), No. 0 pp. 1-17, DOI: 10.1111/cgf.14283.

Philip et al., "Multi-view Relighting using a Geometry-Aware Network", ACM Trans. Graph., vol. 38, No. 4, Article 78. Publication date: Jul. 2019.

Philip et al., "Supplemental for : Multi-view Relighting using a Geometry-Aware Network", ACM Trans. Graph., vol. 38, No. 4, Article 78. Publication date: Jul. 2019.

Rantfl et al., "Towards Robust Monocular Depth Estimation: Mixing Datasets for Zero-shot Cross-dataset Transfer", arXiv:1907.01341v3 [cs.CV] Aug. 25, 2020.

Srinivasan et al., "NeRV: Neural Reflectance and Visibility Fields for Relighting and View Synthesis", arXiv:2012.03927v1 [cs.CV] Dec. 7, 2020.

Yu et al., "pixelNeRF: Neural Radiance Fields from One or Few Images", arXiv:2012.02190v3 [cs.CV] May 30, 2021.

Zhang et al., "A Driver Fatigue Recognition Algorithm Based on Spatio-Temporal Feature Sequence", https://ieeexplore.ieee.org/xpl/conhome/8955993/proceeding, DOI: 10.1109/CISP-BMEI48845.2019.8965990.

Zhang et al., "NeRFactor: Neural Factorization of Shape and Reflectance Under an Unknown Illumination", arXiv:2106.01970v1 [cs.CV] Jun. 3, 2021.

Hu et al., "Worldsheet: Wrapping the World in a 3D Sheet for View Synthesis from a Single Image", arXiv:2012.09854v3 [cs.CV] Aug. 18, 2021.

Non-Final Office Action dated Jan. 30, 2023 re U.S. Appl. No. 17/523,210, filed Nov. 10, 2021.

Notice of Allowance dated Jun. 7, 2023 re U.S. Appl. No. 17/523,210, filed Nov. 10, 2021.

* cited by examiner

SINGLE-PERSPECTIVE IMAGE RELIGHTING

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object-tracking systems. Machine-learning algorithms can be used on board vehicles to operate advanced driver assistance systems (ADAS) or perform autonomous operation based on detecting objects in images, e.g., taken by cameras on board vehicles as the vehicles are driving.

DETAILED DESCRIPTION

Figure 1:
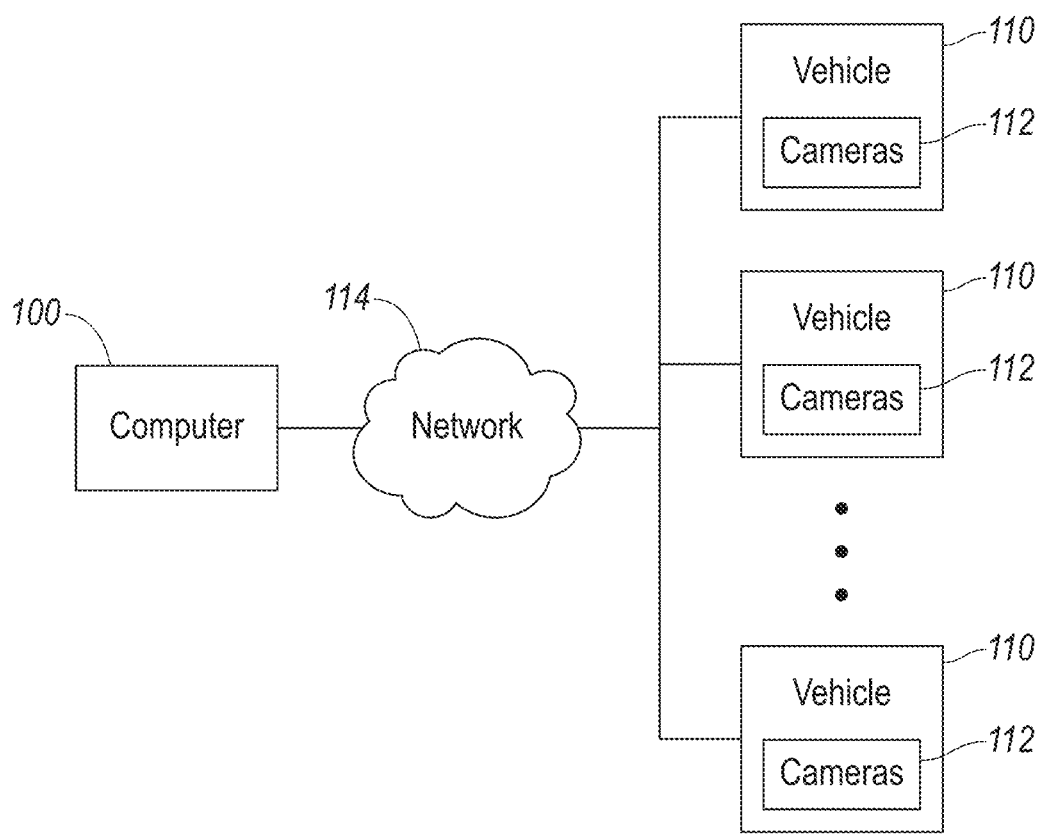
FIG. 1 is a block diagram of example vehicles collecting image data.

This disclosure provides techniques to use a first image of a scene in a first lighting condition to generate a second image of the scene in a second lighting condition. The lighting condition can include, e.g., a light direction, e.g., a sun angle. The second image can be of the same scene from the same perspective as the first image but with different shadows from the different lighting condition. For the purposes of this disclosure, a perspective of an image is defined as a point of view of a camera that captured that image or, for artificially generated images, a point of view of a hypothetical camera that would have captured that image. For example, the first image (i.e., the natural image) can be a scene of a roadway taken from a vehicle driving down the roadway at 9:00 AM, and the techniques herein can generate second images (i.e., artificial images) of the same scene from the same perspective as the first image as though taken at 12:00 noon, 3:00 PM, and 6:00 PM. Because the second images are artificially generated, the vehicle does not need to re-travel the roadway at the later times. Having a dataset of images of scenes with a variety of lighting conditions can be useful for training a machine-learning algorithm for tasks such as object recognition that can depend on interpreting shadows.

Specifically, a computer can be programmed to receive the first image of the scene in the first lighting condition, generate a three-dimensional representation of the scene based on the first image, and generate the second image based on the three-dimensional representation and on the first image. Importantly, the first image is the only image of the scene used for generating the three-dimensional representation and the second image. The computer does not need multiple views of the scene for generating the three-dimensional representation and the second image. Even though collecting multiple views can be feasible in many nonvehicle contexts, collecting multiple views can be difficult using a camera on board a vehicle because collecting the multiple views would typically require the vehicle to leave the roadway. The techniques herein avoid the difficulties related to collecting multiple views.

A computer includes a processor and a memory storing instructions executable by the processor to receive a first image of a scene in a first lighting condition, generate a three-dimensional representation of the scene based on the first image, and generate a second image of the scene in a second lighting condition based on the three-dimensional representation and on the first image. The first image is an only image of the scene used for generating the three-dimensional representation. The first image is an only image of the scene used for generating the second image.

The first image and the second image may have a same perspective of the scene.

The instructions may further include instructions to generate a shadow mask of the scene in the second lighting condition from a perspective of the first image, and generating the second image may be based on the shadow mask.

The instructions may further include instructions to generate a shadow mask of the first image, and generating the second image may be based on the shadow mask. The shadow mask may be a first shadow mask, the instructions may further include instructions to generate a second shadow mask of the scene in the second lighting condition from a perspective of the first image, and generating the second image may be based on the second shadow mask. The second lighting condition may include a light direction, and generating the second shadow mask may include determining shadow locations by projecting objects in the three-dimensional representation along the light direction.

Generating the first shadow mask may include executing a first machine-learning algorithm, generating the second shadow mask may include executing a second machine-learning algorithm, and the first image may be an input to the first machine-learning algorithm and to the second machine-learning algorithm. The first machine-learning algorithm and the second machine-learning algorithm may be jointly trained.

The instructions may further include instructions to generate a reflectance map of the scene from the perspective of the first image based on the three-dimensional representation, the reflectance map may be a map of specular reflection direction based on a light direction of the second lighting condition, generating the second image may be based on the reflectance map, generating the second image may include executing a machine-learning algorithm, and the first image, the first shadow mask, the second shadow mask, and the reflectance map may be inputs to the machine-learning algorithm.

Generating the second image may include executing a machine-learning algorithm, and the first image, the first shadow mask, and the second shadow mask may be inputs to the machine-learning algorithm. The machine-learning algorithm may be a first machine-learning algorithm, generating the first shadow mask may include executing a second machine-learning algorithm, generating the second shadow mask may include executing a third machine-learning algorithm, and the first image may be an input to the second machine-learning algorithm and to the third machine-learning algorithm. The first machine-learning algorithm, the second machine-learning algorithm, and the third machine-learning algorithm may be jointly trained.

The second lighting condition may include a light direction, generating the second shadow mask may include determining a preliminary second shadow mask having shadow locations by projecting objects in the three-dimensional representation along the light direction, and the preliminary second shadow mask may be an input to the second machine-learning algorithm.

The instructions further may include instructions to generate a reflectance map of the scene from a perspective of the first image based on the three-dimensional representation, the reflectance map may be a map of specular reflection direction based on a light direction of the second lighting condition, and generating the second image may be based on the reflectance map. The instructions may further include instructions to generate a normal map of the scene from the perspective of the first image based on the three-dimensional representation, and generating the reflectance map may be based on the normal map and the second lighting condition.

Generating the second image may include executing a machine-learning algorithm, and the machine-learning algorithm may be a convolutional neural network.

The three-dimensional representation may be a mesh. The mesh may include a plurality of vertices, and generating the mesh may include generating a depth map of the first image and determining values for depths of the vertices relative to a perspective of the first image based on the depth map.

The mesh may include a plurality of vertices, and generating the mesh may include generating a feature map of the first image and determining values for heights and widths of the vertices relative to a perspective of the first image based on the feature map.

A method includes receiving a first image of a scene in a first lighting condition, generating a three-dimensional representation of the scene based on the first image, and generating a second image of the scene in a second lighting condition based on the three-dimensional representation and on the first image. The first image is an only image of the scene used for generating the three-dimensional representation. The first image is an only image of the scene used for generating the second image.

With reference to the Figures, wherein like numerals indicate like parts throughout the several views, a computer 100 includes a processor and a memory storing instructions executable by the processor to receive a first image 102 of a scene 104 in a first lighting condition, generate a three-dimensional representation 106 of the scene 104 based on the first image 102, and generate a second image 108 of the scene 104 in a second lighting condition based on the three-dimensional representation 106 and on the first image 102. The first image 102 is an only image of the scene 104 used for generating the three-dimensional representation 106. The first image 102 is an only image of the scene 104 used for generating the second image 108.

With reference to FIG. 1, vehicles 110 may be used for collecting images of scenes 104. The vehicles 110 may be any passenger or commercial automobile such as a car, a truck, a sport utility vehicle, a crossover, a van, a minivan, a taxi, a bus, etc.

The vehicles 110 can each include one or more cameras 112. The cameras 112 can detect electromagnetic radiation in some range of wavelengths. For example, the cameras 112 may detect visible light, infrared radiation, ultraviolet light, or some range of wavelengths including visible, infrared, and/or ultraviolet light. For example, the cameras 112 can be charge-coupled devices (CCD), complementary metal oxide semiconductors (CMOS), or any other suitable type.

The vehicles 110 can transmit images from the cameras 112 to the computer 100 via a network 114. The network 114 represents one or more mechanisms by which the computer 100 may communicate with a remote server. Accordingly, the network 114 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together.

Figure 2:
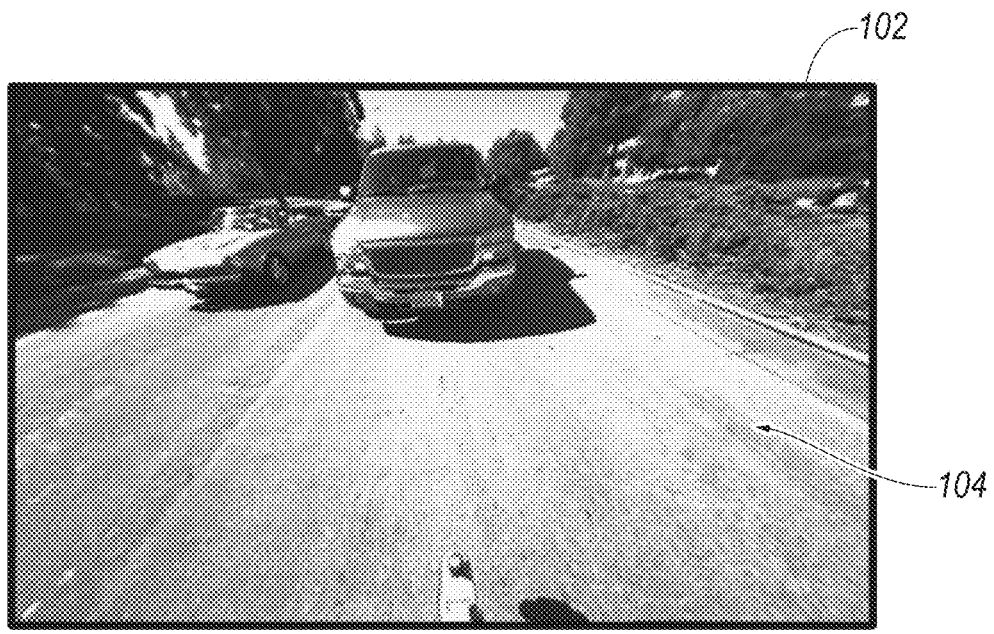
FIG. 2 is an image of an example scene in a first lighting condition.

With reference to FIG. 2, the computer 100 can receive the first image 102, either from one of the cameras 112 on board one of the vehicles 110 or from another source. The first image 102 (as well as the artificially generated second image 108) is a two-dimensional matrix of pixels. The first image 102 and second image 108 can be color images. Each pixel can have a color represented as one or more numerical values, e.g., values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image, i.e., position in the field of view of the camera 112, can be specified in pixel dimensions or coordinates, e.g., an ordered pair of pixel distances, such as a number of pixels from a top edge and a number of pixels from a left edge of the field of view.

The first image 102 and the second image 108 depict a common scene 104. The scene 104 is the external environment captured in the image, i.e., physical features or attributes such as objects, terrain features, etc. For example, in FIG. 2, the first image 102 was captured by a rear-facing camera 112 on board a vehicle 110, and the scene 104 in the first image 102 includes a trailer hitch of the vehicle 110, a roadway on which the vehicle 110 is traveling, two other vehicles on the roadway, curbs along the edges of the roadway, bushes and trees alongside the roadway, etc.

The scene 104 as depicted in the first image 102 is in a first lighting condition, and the scene 104 as depicted in the second image 108 (shown in FIG. 7) is in a second lighting condition. The lighting condition defines how light is transmitted through the scene 104. For example, a lighting condition can include a light direction (e.g., sun angle), light diffuseness (e.g., clear or overcast sky), locations and directions of point sources of light (e.g., streetlamps), etc.

Figure 3:
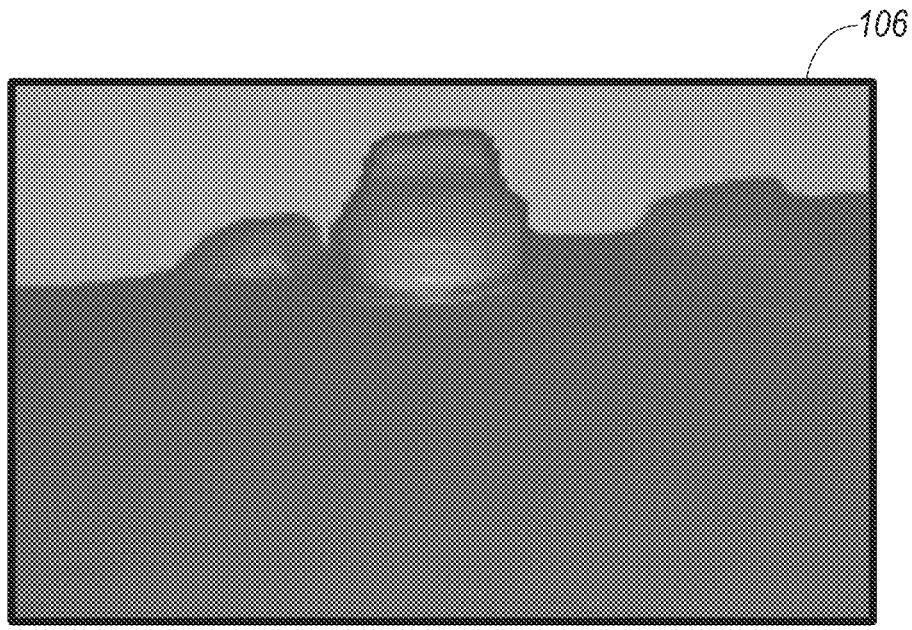
FIG. 3 is an image of an example mesh of the scene.

With reference to FIG. 3, the computer 100 can generate the three-dimensional representation 106 of the scene 104.

The three-dimensional representation 106 is data defining positions and orientations in space for points, edges, surfaces, etc., which can be manipulated to approximate the objects, terrain, etc. of the scene 104. The three-dimensional representation 106 can be any suitable type, e.g., a mesh, a point cloud, etc. As a mesh, the three-dimensional representation 106 can include a plurality of vertices, edges connecting the vertices, and polygons circumscribed by the edges. The mesh can be a polyhedral representation of the scene 104.

Figure 4:
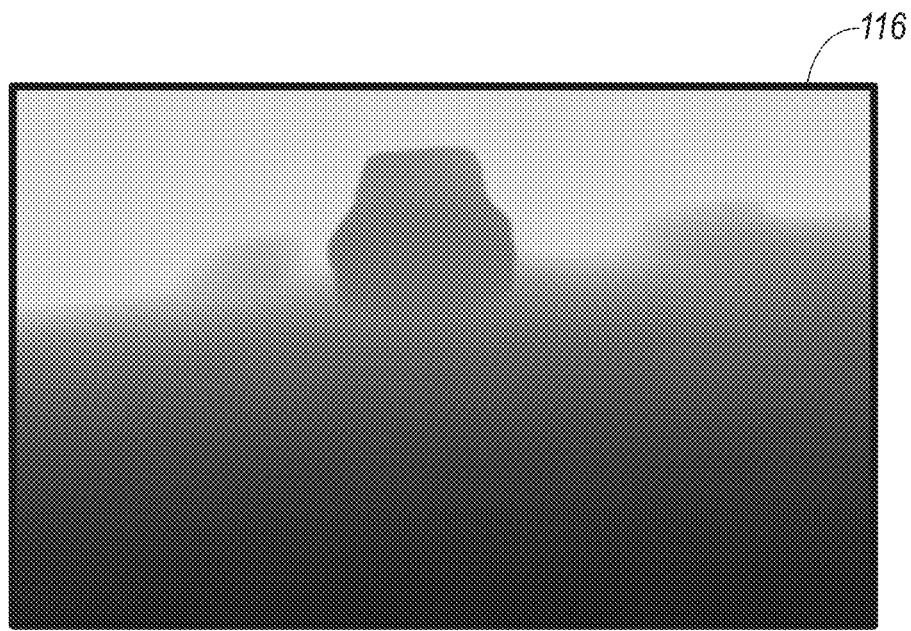
FIG. 4 is an image of an example depth map of the scene.

With reference to FIGS. 3 and 4, in a first example, generating the three-dimensional representation 106 as a mesh can include generating a depth map 116 of the first image 102, generating a feature map of the first image 102, determining values for depths of the vertices relative to a perspective of the first image 102 based on the depth map 116, and determining values for heights and widths of the vertices relative to a perspective of the first image 102 based on the feature map, as will be described in turn. The first image 102 is thus the only image of the scene 104 used for generating the three-dimensional representation 106.

With reference to FIG. 4, generating the mesh can include generating the depth map 116 of the first image 102. The depth map 116 can be an image containing information relating to distances of surfaces in the environment from the perspective of the camera 112. For example, each pixel can have a depth value. The depth value can be a unitless scalar value specifying the depth, e.g., ranging from 1 for closest to 0 for farthest (or vice versa). The depth map 116 can be the same pixel size as the first image 102. The depth map 116 can be a pixelwise depth map from the first image 102, i.e., each pixel of the depth map 116 can have a depth value for the pixel having the same pixel coordinates in the first image 102.

Generating the depth map 116 can use monocular depth estimation, i.e., estimating depths based on a single view rather than stereo views. Any suitable technique for monocular depth estimation can be used, e.g., executing a machine-learning algorithm such as a convolutional neural network. The convolutional neural network can be trained on a dataset of images for which ground-truth depth measurements are known.

Generating the mesh can include generating a feature map of the first image 102. A feature map provides location in an image, e.g., in pixel coordinates, of features of interest such as edges of objects. The computer 100 can execute a machine-learning algorithm such as a convolutional neural network to generate the feature map. For example, the convolutional neural network can be trained to identify objects in images, and the feature map can be generated at an intermediate layer of the convolutional neural network.

With reference to FIGS. 3 and 4, the computer 100 can determine values for the positions of the vertices of the mesh based on the depth map 116 and/or the feature map. The positions of the vertices can be represented as three-dimensional coordinates, e.g., as two-dimensional coordinates of a location in the image and a one-dimensional depth from the perspective of the image, e.g., (x, y, z), in which x is a width of a vertex in the image (e.g., from a left edge of the image), y is a height of a vertex in the image (e.g., from a top edge of the image), and z is a depth from the perspective of the image, e.g., from the camera 112.

The computer 100 can determine values for the heights and the widths of the vertices relative to the perspective of the first image 102 based on the feature map. For example, the values for the heights and widths (x, y) can be determined as offsets from a lattice grid overlaid on the first image 102 to align with locations of features from the feature map. The lattice grid can be a collection of evenly spaced points overlaid on the first image 102. For each point, the computer 100 can determine how much the point should move horizontally and vertically in the first image 102 to align with a feature of the feature map. For example, the offsets for the grid points can be determined with the following equations:

$$\Delta \hat{x} = \frac{\tanh(W_1 q + b_1)}{X_{grid} - 1}$$

$$\Delta \hat{y} = \frac{\tanh(W_2 q + b_2)}{Y_{grid} - 1}$$

in which $(\Delta \hat{x}, \Delta \hat{y})$ are the width and height offsets of the grid points; $W_1$, $b_1$, $W_2$, and $b_2$ are constants chosen based on the size of the images; q represents the closest feature from the feature map; and $(X_{grid}, Y_{grid})$ is the width and height of the lattice grid.

The computer 100 can determine values for the depths of the vertices relative to the perspective of the first image 102 based on the depth map 116. For example, after offsetting the grid points, the computer 100 can sample the depth values z at the corresponding locations in the depth map 116. That is, for each vertex, the width and height (x, y) is a location of a grid point after offsetting as just described, and the depth z is the depth value of the location of the grid point in the depth map 116.

The coordinates of the vertices can be converted into a mutually orthogonal coordinate system as follows:

$$V = \begin{bmatrix} z \cdot (\hat{x} + \Delta \hat{x}) \cdot \tan(\theta_F/2) \\ z \cdot (\hat{y} + \Delta \hat{y}) \cdot \tan(\theta_F/2) \\ z \end{bmatrix}$$

in which V is a matrix of vertex coordinates, $(\hat{x}, \hat{y})$ are the pre-offset width and height of the grid points; $(\Delta \hat{x}, \Delta \hat{y})$ are the width and height offsets of the grid points; z is the depth of the grid points; and $\theta_F$ is the field of view of the camera 112.

In a second example, generating the three-dimensional representation 106 of the scene 104 can include generating a feature map of the first image 102, generating a scalar field based on the feature map, and generating a mesh by applying a marching-cubes algorithms to the scalar field, as will be described in turn. The first image 102 is thus the only image of the scene 104 used for generating the three-dimensional representation 106. The feature map can be generated as described above in the first example.

A scalar field is a space in which each point has a scalar value assigned. The computer 100 can generate the scalar field by using a machine-learning algorithm such as a multilayer perceptron. The output of the multilayer perceptron can be volume densities and color values (e.g., represented as RGB values) at positions of features in the feature map. Integrating the color values weighted by volume density along rays in space can give the scalar color values for the scalar field.

The computer 100 can generate the three-dimensional representation 106 as a mesh by applying the marching-cubes algorithm to the scalar field. The marching-cubes algorithm generates a mesh by following an isosurface in the scalar field, i.e., generating a surface for which the scalar values in the scalar field are the same or within a bound of each other.

Figure 5:
FIG. 5 is an image of an example shadow mask of the scene in the first lighting condition.
Figure 6:
FIG. 6 is an image of an example shadow mask of the scene in a second lighting condition.

With reference to FIGS. 5 and 6, the computer 100 can generate a first shadow mask 118 of the scene 104 in the first lighting condition (i.e., a first shadow mask 118 of the first image 102) and a second shadow mask 120 of the scene 104 in the second lighting condition, both based on the three-dimensional representation 106. A shadow mask indicates locations of shadows in an image. Generating the shadow masks 118, 120 can include projecting objects in the three-dimensional representation 106 along the light direction of the respective lighting condition. The objects are projected onto surfaces in the three-dimensional representation 106, and those surfaces are thereby determined to be in shadow. Those shadows are then projected onto an image plane of the first image 102 to create the respective shadow mask 118, 120. The first shadow mask 118 and the second shadow mask 120 can both be from the perspective of the first image 102. The first shadow mask 118 can be of the scene 104 in the first lighting condition, and the second shadow mask 120 can be of the scene 104 in the second lighting condition. The first shadow mask 118 and second shadow mask 120 can be used directly as inputs in the step of generating the second image 108 below, or the first shadow mask 118 and second shadow mask 120 as just described can be preliminary shadow masks 118a, 120a that will be further refined, as will now be described.

With reference to FIG. 5, generating the first shadow mask 118 can include executing a machine-learning algorithm to turn the preliminary first shadow mask 118a into a refined first shadow mask 118b. The refined first shadow mask 118b can be of the scene 104 from the perspective of the first image 102 in the first lighting condition. The first image 102 and the preliminary first shadow mask 118a can be inputs to the machine-learning algorithm. Using the first image 102 as an input can provide a corrective for inaccuracies in the preliminary first shadow mask 118a resulting from inaccuracies in the three-dimensional representation 106. The machine-learning algorithm can be, e.g., an encoder-decoder neural network. The machine-learning algorithm can be trained on a dataset of artificially generated images of scenes 104 made using three-dimensional representations of the scenes 104 (different than the three-dimensional representations 106 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training.

With reference to FIG. 6, generating the second shadow mask 120 can include executing a machine-learning algorithm to turn the preliminary second shadow mask 120a into a refined second shadow mask 120b. The refined second shadow mask 120b can be of the scene 104 from the perspective of the first image 102 in the second lighting condition. The first image 102 and the preliminary second shadow mask 120a can be inputs to the machine-learning algorithm. Using the first image 102 as an input can provide a corrective for inaccuracies in the preliminary second shadow mask 120a resulting from inaccuracies in the three-dimensional representation 106. The machine-learning program for generating the second shadow mask 120 can operate independently of the machine-learning program for generating the first shadow mask 118. Independent operation can prevent the preliminary second shadow mask 120a from decreasing the accuracy of the refined first shadow mask 118b. The machine-learning algorithm can be, e.g., an encoder-decoder neural network. The machine-learning algorithm can be trained on a dataset of artificially generated images of scenes 104 made using three-dimensional representations of the scenes 104 (different than the three-dimensional representations 106 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training.

The computer 100 can generate a normal map of the scene 104 from the perspective of the first image 102 based on the three-dimensional representation 106. A normal map includes surface normals, i.e., vectors perpendicular to respective surfaces, for points on surfaces of the scene 104 shown in the first image 102. For example, the computer 100 can calculate the surface normal for each polygon of the mesh visible from the perspective of the first image 102.

The computer 100 can generate a reflectance map of the scene 104 from the perspective of the first image 102 based on the three-dimensional representation 106, e.g., based on the normal map that is based on the three-dimensional representation 106, and based on the second lighting condition, e.g., the lighting direction of the second lighting condition. The reflectance map can be a map of specular reflection direction based on the light direction of the second lighting direction. For example, the reflectance map can include, for each surface or pixel shown, the dot product between the direction from the camera 112 to the surface and the mirror reflection of the incoming light ray at the surface (known from the light direction and the surface normal), i.e., how much the direction of the camera 112 projects onto the reflected light.

Figure 7:
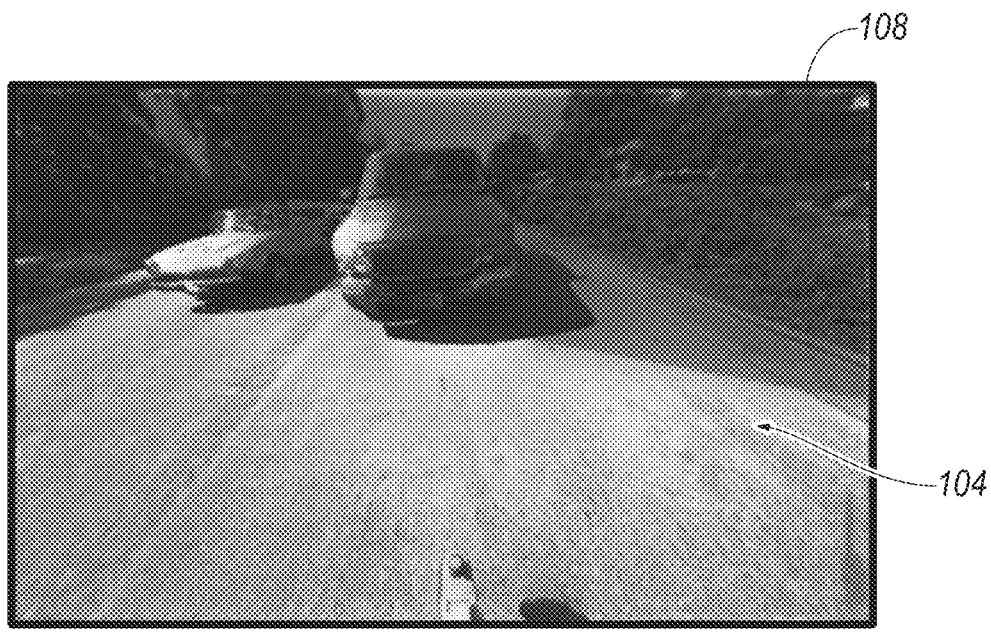
FIG. 7 is an artificial image of the scene in the second lighting condition.

With reference to FIG. 7, the computer 100 can generate the second image 108 of the scene 104 in the second lighting condition based on the three-dimensional representation 106 and on the first image 102. For example, the second image 108 can be based on the first shadow mask 118, the second shadow mask 120, and/or the reflectance map, all of which are based on the three-dimensional representation 106. The first image 102 is the only image of the scene 104 used for generating the three-dimensional representation 106, and the first image 102 is the only image used for generating the second image 108, directly or indirectly. The second image 108 can have a same perspective of the scene 104 as the first image 102 does.

For example, generating the second image 108 can include executing a machine-learning program. The first image 102, the first shadow mask 118 (preliminary or refined), the second shadow mask 120 (preliminary or refined), the reflectance map, and the light direction of the second lighting condition can be the inputs to the machine-learning algorithm. The light direction can be represented as, e.g., a unit vector. The machine-learning algorithm can be, e.g., a convolutional neural network. The machine-learning algorithm can be trained on a dataset of artificially generated images of scenes 104 made using three-dimensional representations of the scenes 104 (different than the three-dimensional representations 106 discussed above). The three-dimensional representations can include colors and/or textures. The three-dimensional representations can be constructed, and then images and shadow masks can be generated from the three-dimensional representations. The images can serve as inputs to the machine-learning program during training, and the shadow masks can serve as ground truth during training. The machine-learning algorithm for generating the second image 108 can be jointly trained with the machine-learning algorithms for refining the first shadow mask 118 and second shadow mask 120. Jointly training the machine-learning algorithms can improve how useful the first shadow mask 118 and second shadow mask 120 are to the machine-learning algorithm for generating the second image 108.

Figure 8:
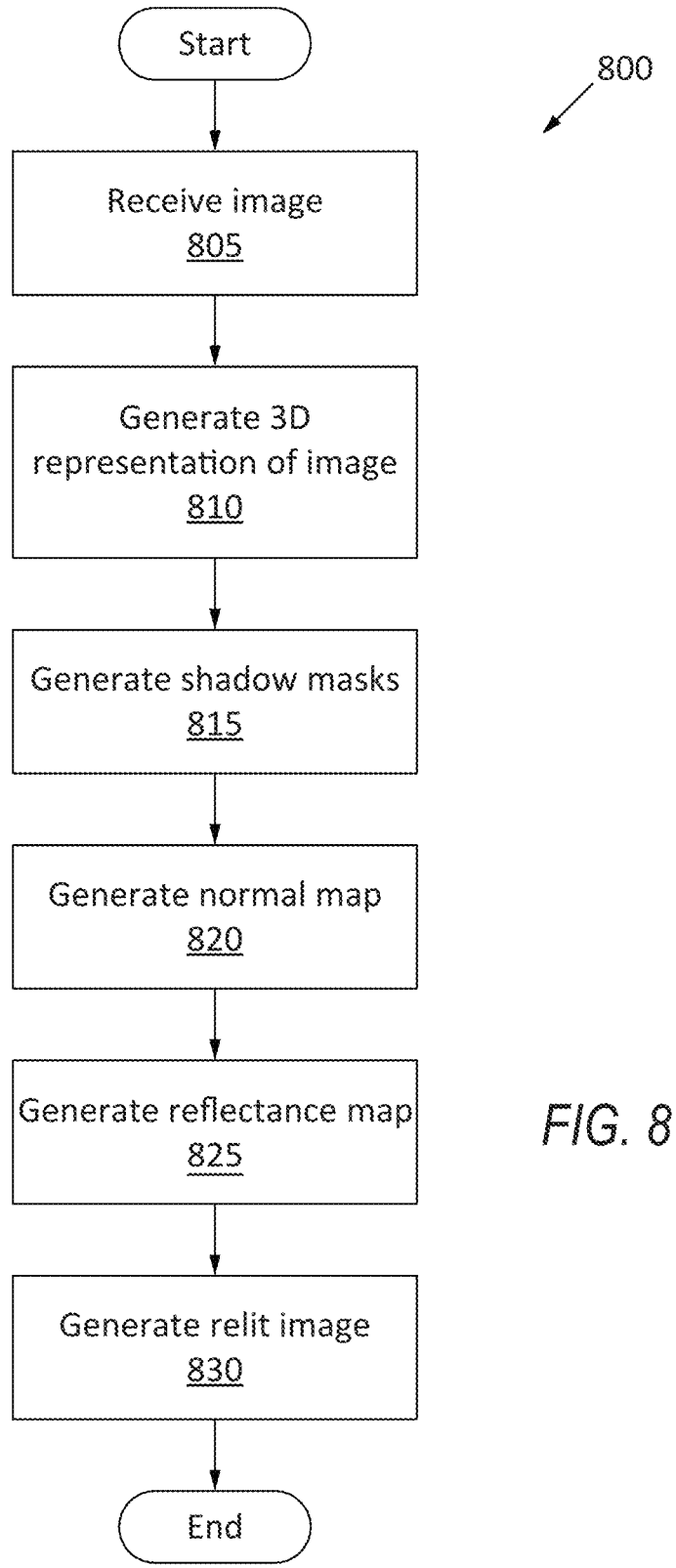
FIG. 8 is a process flow diagram of an example process for generating the artificial image of the scene in the second lighting condition.

FIG. 8 is a process flow diagram illustrating an exemplary process 800 for generating the second image 108 of the scene 104 in the second lighting condition. The memory of the computer 100 stores executable instructions for performing the steps of the process 800. As a general overview of the process 800, the computer 100 receives the first image 102, generates the three-dimensional representation 106 based on the first image 102, generates the first shadow mask 118 and second shadow mask 120, generates the normal map, generates the reflectance map, and generates the second image 108.

The process 800 begins in a block 805, in which the computer 100 receives the first image 102 of the scene 104 in the first lighting condition, as described above.

Next, in a block 810, the computer 100 generates the three-dimensional representation 106 based on the first image 102, as described above.

Next, in a block 815, the computer 100 generates the first shadow mask 118 and the second shadow mask 120, as described above. The computer 100 can either generate the preliminary shadow masks 118a, 120a to use as the first shadow mask 118 and the second shadow mask 120, or the computer 100 can refine the preliminary shadow masks 118a, 120a and use the refined shadow masks 118b, 120b as the first shadow mask 118 and second shadow mask 120. Generating the shadow masks in the block 815 can occur before, concurrently with, or after generating the normal map and the reflectance map in blocks 820 and 825.

Next, in the block 820, the computer 100 generates the normal map of the scene 104 from the perspective of the first image 102 based on the three-dimensional representation 106, as described above.

Next, in the block 825, the computer 100 generates the reflectance map of the scene 104 from the perspective of the first image 102 based on the three-dimensional representation 106, e.g., based on the normal map, and based on the light direction of the second lighting condition, as described above.

Next, in a block 830, the computer 100 generates the second image 108 of the scene 104 in the second lighting condition based on the first image 102 and on the three-dimensional representation 106, e.g., based on the first shadow mask 118, the second shadow mask 120, and the reflectance map, as described above. The first image 102 is the only image of the scene 104 used for generating the three-dimensional representation 106, and the first image 102 is the only image used for generating the second image 108. After the block 830, the process 800 ends.

Figure 9:
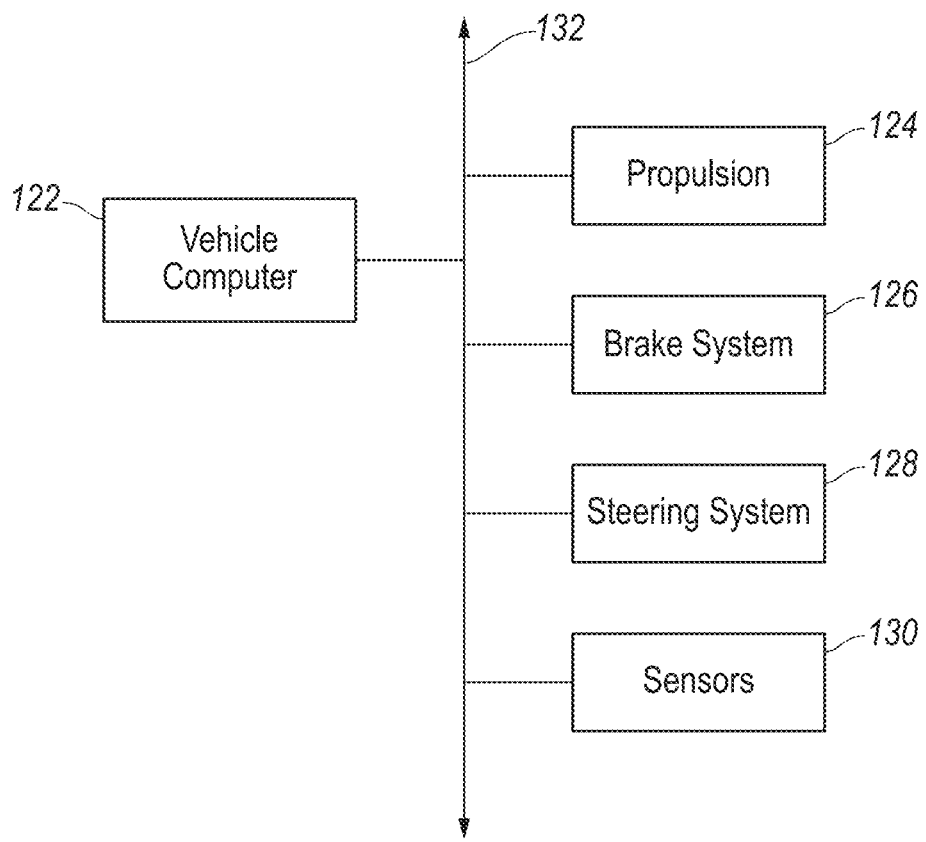
FIG. 9 is a block diagram of an example vehicle.

With reference to FIG. 9, the vehicle 110 may be an autonomous vehicle. A vehicle computer 122 can be programmed to operate the vehicle 110 independently of the intervention of a human operator, completely or to a lesser degree. The vehicle computer 122 may be programmed to operate a propulsion 124, a brake system 126, a steering system 128, and/or other vehicle systems based on data received from sensors 130. For the purposes of this disclosure, autonomous operation means the vehicle computer 122 controls the propulsion 124, brake system 126, and steering system 128 without input from a human operator; semi-autonomous operation means the vehicle computer 122 controls one or two of the propulsion 124, brake system 126, and steering system 128 and a human operator controls the remainder; and nonautonomous operation means a human operator controls the propulsion 124, brake system 126, and steering system 128.

The vehicle computer 122 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 122 can thus include a processor, a memory, etc. The memory of the vehicle computer 122 can include media for storing instructions executable by the processor as well as for electronically storing data and/or databases, and/or the vehicle computer 122 can include structures such as the foregoing by which programming is provided. The vehicle computer 122 can be multiple computers coupled together.

The computer may transmit and receive data through a communications network 132 such as a controller area network (CAN) bus, Ethernet, WiFi, Local Interconnect Network (LIN), onboard diagnostics connector (OBD-II), and/or by any other wired or wireless communications network. The computer may be communicatively coupled to the sensors 130, the propulsion 124, the brake system 126, the steering system 128, and other components via the communications network 132.

The sensors 130 may provide data about operation of the vehicle 110, for example, wheel speed, wheel orientation, and engine and transmission data (e.g., temperature, fuel consumption, etc.). The sensors 130 may detect the location and/or orientation of the vehicle 110. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may detect the external world, e.g., objects and/or characteristics of surroundings of the vehicle 110, such as other vehicles, road lane markings, traffic lights and/or signs, pedestrians, etc. For example, the sensors 130 may include radar sensors, scanning laser range finders, light detection and ranging (LIDAR) devices, and image processing sensors such as the cameras 112.

The propulsion 124 of the vehicle 110 generates energy and translates the energy into motion of the vehicle 110. The propulsion 124 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 124 can include an electronic control unit (ECU) or the like that is in communication with and receives input from the computer and/or a human operator. The human operator may control the propulsion 124 via, e.g., an accelerator pedal and/or a gear-shift lever.

The brake system 126 is typically a conventional vehicle braking subsystem and resists the motion of the vehicle 110 to thereby slow and/or stop the vehicle 110. The brake system 126 may include friction brakes such as disc brakes, drum brakes, band brakes, etc.; regenerative brakes; any other suitable type of brakes; or a combination. The brake system 126 can include an electronic control unit (ECU) or the like that is in communication with and receives input from the computer and/or a human operator. The human operator may control the brake system 126 via, e.g., a brake pedal.

The steering system 128 is typically a conventional vehicle steering subsystem and controls the turning of the wheels. The steering system 128 may be a rack-and-pinion system with electric power-assisted steering, a steer-by-wire system, as both are known, or any other suitable system. The steering system 128 can include an electronic control unit (ECU) or the like that is in communication with and receives input from the computer and/or a human operator. The human operator may control the steering system 128 via, e.g., a steering wheel.

Figure 10:
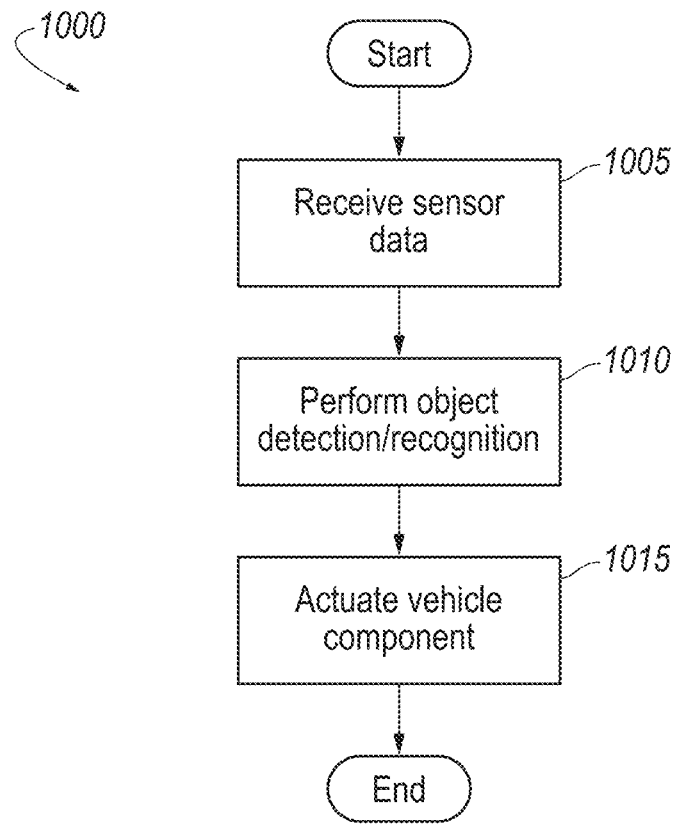
FIG. 10 is a process flow diagram of an example process for operating the vehicle using a machine-learning algorithm trained on the artificial images.

FIG. 10 is a process flow diagram illustrating an exemplary process 1000 for autonomously or semi-autonomously operating a vehicle 110 using a machine-learning algorithm trained on the first images 102 and second images 108. The vehicle 110 can be different than the vehicle 110 that collected the first images 102. The memory of the vehicle computer 122 stores executable instructions for performing the steps of the process 1000 and/or programming can be implemented in structures such as mentioned above. As a general overview of the process 1000, the vehicle computer 122 receives data from the sensors 130, performs object detection and/or recognition on the data, and actuates a component of the vehicle 110 based on the object detection and/or recognition.

The process 1000 begins in a block 1005, in which the vehicle computer 122 receives data from the sensors 130, including images from the cameras 112.

Next, in a block 1010, the vehicle computer 122 performs object detection and/or recognition on the images. The object detection and/or recognition can be performed by using a machine-learning algorithm trained on the first images 102 and second images 108, e.g., a convolutional neural network. The machine-learning algorithm trained using the second images 108 may be able to better detect or recognize objects than if the machine-learning algorithm were trained on a different dataset.

Next, in a block 1015, the vehicle computer 122 actuates at least one vehicle component of the vehicle 110 based on the detected and/or recognized objects. For example, the vehicle computer 122 can actuate at least one of the propulsion 124, the brake system 126, or the steering system 128. For example, the vehicle computer 122 may actuate the brake system 126 based on the distances to the detected objects as part of an automatic-braking feature, e.g., braking to prevent the vehicle 110 from contacting one of the objects. The vehicle computer 122 can, if any of the detected objects are positioned in front of the vehicle 110 and are within a distance threshold of the vehicle 110, instruct the brake system 126 to actuate. The distance threshold can be chosen based on a stopping distance of the vehicle 110 and may vary with a speed of the vehicle 110. For another example, the vehicle computer 122 may operate the vehicle 110 autonomously, i.e., actuating the propulsion 124, the brake system 126, and the steering system 128 based on the identities of the objects, e.g., to navigate the vehicle 110 around the objects in the environment. For example, the vehicle computer 122 may navigate the vehicle 110 to provide a larger buffer if the object is a type that moves, e.g., motorcycle, than a type that is stationary, e.g., mailbox. After the block 1015, the process 1000 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive a first image of a scene in a first lighting condition;
   generate a three-dimensional representation of the scene based on the first image, wherein the first image is an only image of the scene used for generating the three-dimensional representation;
   generate a first shadow mask of the first image, wherein generating the first shadow mask includes executing a second machine-learning algorithm, and the first image is an input to the second machine-learning algorithm;
   generate a second shadow mask of the scene in the second lighting condition from a perspective of the first image, wherein generating the second shadow mask includes executing a third machine-learning algorithm, and the first image is an input to the third machine-learning algorithm; and
   generate a second image of the scene in a second lighting condition based on the three-dimensional representation, on the first image, on the first shadow mask, and on the second shadow mask, wherein the first image is an only image of the scene used for generating the second image, generating the second image includes executing a first machine-learning algorithm, and the first image, the first shadow mask, and the second shadow mask are inputs to the first machine-learning algorithm.

2. The computer of claim 1, wherein the first image and the second image have a same perspective of the scene.

3. The computer of claim 1, wherein the second lighting condition includes a light direction, and generating the second shadow mask includes determining shadow locations by projecting objects in the three-dimensional representation along the light direction.

4. The computer of claim 1, wherein the second machine-learning algorithm and the third machine-learning algorithm are jointly trained.

5. The computer of claim 1, wherein the instructions further include instructions to generate a reflectance map of the scene from the perspective of the first image based on the three-dimensional representation, the reflectance map is a map of specular reflection direction based on a light direction of the second lighting condition, generating the second image is based on the reflectance map, the reflectance map is an input to the first machine-learning algorithm.

6. The computer of claim 1, wherein the first machine-learning algorithm, the second machine-learning algorithm, and the third machine-learning algorithm are jointly trained.

7. The computer of claim 1, wherein the second lighting condition includes a light direction, generating the second shadow mask includes determining a preliminary second shadow mask having shadow locations by projecting objects in the three-dimensional representation along the light direction, and the preliminary second shadow mask is an input to the second machine-learning algorithm.

8. The computer of claim 1, wherein the instructions further include instructions to generate a reflectance map of the scene from the perspective of the first image based on the three-dimensional representation, the reflectance map is a map of specular reflection direction based on a light direction of the second lighting condition, and generating the second image is based on the reflectance map.

9. The computer of claim 8, wherein the instructions further include instructions to generate a normal map of the scene from the perspective of the first image based on the three-dimensional representation, and generating the reflectance map is based on the normal map and the second lighting condition.

10. The computer of claim 1, wherein the first machine-learning algorithm is a convolutional neural network.

11. The computer of claim 1, wherein the three-dimensional representation is a mesh.

12. The computer of claim 11, wherein the mesh includes a plurality of vertices, and generating the mesh includes generating a depth map of the first image and determining values for depths of the vertices relative to the perspective of the first image based on the depth map.

13. The computer of claim 11, wherein the mesh includes a plurality of vertices, and generating the mesh includes generating a feature map of the first image and determining values for heights and widths of the vertices relative to the perspective of the first image based on the feature map.

14. A method comprising:
   receiving a first image of a scene in a first lighting condition;
   generating a three-dimensional representation of the scene based on the first image, wherein the first image is an only image of the scene used for generating the three-dimensional representation;
   generating a first shadow mask of the first image, wherein generating the first shadow mask includes executing a second machine-learning algorithm, and the first image is an input to the second machine-learning algorithm;
   generating a second shadow mask of the scene in the second lighting condition from a perspective of the first image, wherein generating the second shadow mask includes executing a third machine-learning algorithm, and the first image is an input to the third machine-learning algorithm; and
   generating a second image of the scene in a second lighting condition based on the three-dimensional representation, on the first image, on the first shadow mask, and on the second shadow mask, wherein the first image is an only image of the scene used for generating the second image, generating the second image includes executing a first machine-learning algorithm, and the first image, the first shadow mask, and the second shadow mask are inputs to the first machine-learning algorithm.

* * * * *